United States Patent
Chen

[19]

[11] Patent Number: 6,030,329
[45] Date of Patent: Feb. 29, 2000

[54] MACHINE FOR MAKING DISK JACKETS

[76] Inventor: Hung-Ho Chen, No. 17, Alley 7, Lane 195, Yung Feng Rd., Tu Cheng City, Taipei, Taiwan

[21] Appl. No.: 09/223,008

[22] Filed: Dec. 30, 1998

[51] Int. Cl.[7] .............................. B31B 1/64; B31B 49/04
[52] U.S. Cl. ...................... 493/197; 493/199; 493/202; 493/203; 53/DIG. 2
[58] Field of Search ................................. 493/186, 189, 493/197, 194, 199, 202, 203; 53/DIG. 2; 156/580.1, 73.1

[56] References Cited

U.S. PATENT DOCUMENTS

| | | | |
|---|---|---|---|
| 4,601,689 | 7/1986 | Finkle et al. | 493/251 |
| 5,009,740 | 4/1991 | Yanai | 493/203 |
| 5,282,778 | 2/1994 | Achelpohl | 493/203 |
| 5,875,614 | 3/1999 | Youngs et al. | 53/DIG. 2 |
| 5,934,043 | 8/1999 | Aindow et al. | 53/DIG. 2 |

*Primary Examiner*—Eugene L. Kim
*Attorney, Agent, or Firm*—Bacon & Thomas, PLLC

[57] ABSTRACT

An automated machine for making standardized disk jackets of consistent quality from non-woven cloth and polypropylene materials includes a machine table, and a raw material mount, a feed roller unit, a first cutter unit, an ultrasonic closure unit, a second cutter unit, a scrap drawing unit, and a conveyor unit disposed in sequence on the machine table. Non-woven cloth and polypropylene material rolls are mounted on the raw material mount. They are drawn, overlapped, cut, sealed using ultrasonic waves, cut into shape, and output as disk jackets for receiving compact disks.

1 Claim, 3 Drawing Sheets

MACHINE FOR MAKING DISK JACKETS

BACKGROUND OF THE INVENTION (a) Field of the Invention

The present invention relates generally to a machine for making disk jackets, and more particularly to an automated machine for making standardized disk jackets of consistent quality from non-woven cloth and polypropylene materials includes a machine table, and a raw material mount, a feed roller unit, a first cutter unit, an ultrasonic closure unit, a second cutter unit, a scrap drawing unit, and a conveyor unit disposed in sequence on the machine table. Non-woven cloth and polypropylene material rolls are mounted on the raw material mount. They are drawn, overlapped, cut, sealed using ultrasonic waves, cut into shape, and output as disk jackets for receiving compact disks.

(b) Description of the Prior Art:

Since compact disks having a diameter of 12 cm have come into existence, software products and video audio optical products, such as CD-ROM, VCD, DVD, etc., of various applications have been developed. In general, these disks are contained in flat disk cases that are made of a rigid plastic material. However, the cost of manufacturing these disk cases is rather high, and their size is much greater than the compact disk itself Therefore, there are problems of storage and organization. There are available on the market different kinds of disk racks or cabinets for storing compact disks along with their cases. However, they are generally space-occupying and often cannot meet the user's storage and organization requirements.

Therefore, some manufacturers of video and audio disks and software have developed an album type disk storage device of paper or thin plastic materials, in which sheets of plastic or non-woven cloth are overlapped and formed into pockets using melting or high frequencies for receiving the disks and providing the surfaces of the disks with some form of protection.

The above-mentioned plastic sheets are generally formed from polyvinyl chloride (PVC) that are pressed into pocket shapes at high temperature or using high frequencies. Although there are not obvious drawbacks with such pocket type disk storing devices in use, the PVC material will generate toxic gases during the manufacturing process, and use thereof is hence prohibited in many countries.

Furthermore, as the sheets of PVC and non-woven material are stacked in multiple layers for cutting purposes. The resultant pockets vary in sizes, with the topmost layer having the largest size, and the bottommost layer having the required size. This is because the topmost layer is the softest with respect to the rest of the layers due to the stacks of sheets below, during cutting, the part of the topmost layer subjected to the cutter will be pressed downwardly, so that its size is the greatest. The relative sizes of the other layers decrease gradually with the bottommost layer having the correct size.

In view of the trend to replace rigid plastic disk cases with soft pockets or jackets for storing disks, and in view of the environmental problem created by use of PVC material in the manufacturing process, as well as the variance in disk pocket sizes, it is desirable to have a machine that can mass-produce disk jackets of standardized specifications in an environmental-friendly manner.

SUMMARY OF THE INVENTION

A primary object of the present invention is to provide a machine for making disk jackets, in which disk jackets can be mass produced at low costs, a and the sizes of the disk jackets can be consistent.

Another object of the present invention is to provide a machine for making disk jackets employing polypropylene material and ultrasonic waves so that no environmental problem will result.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
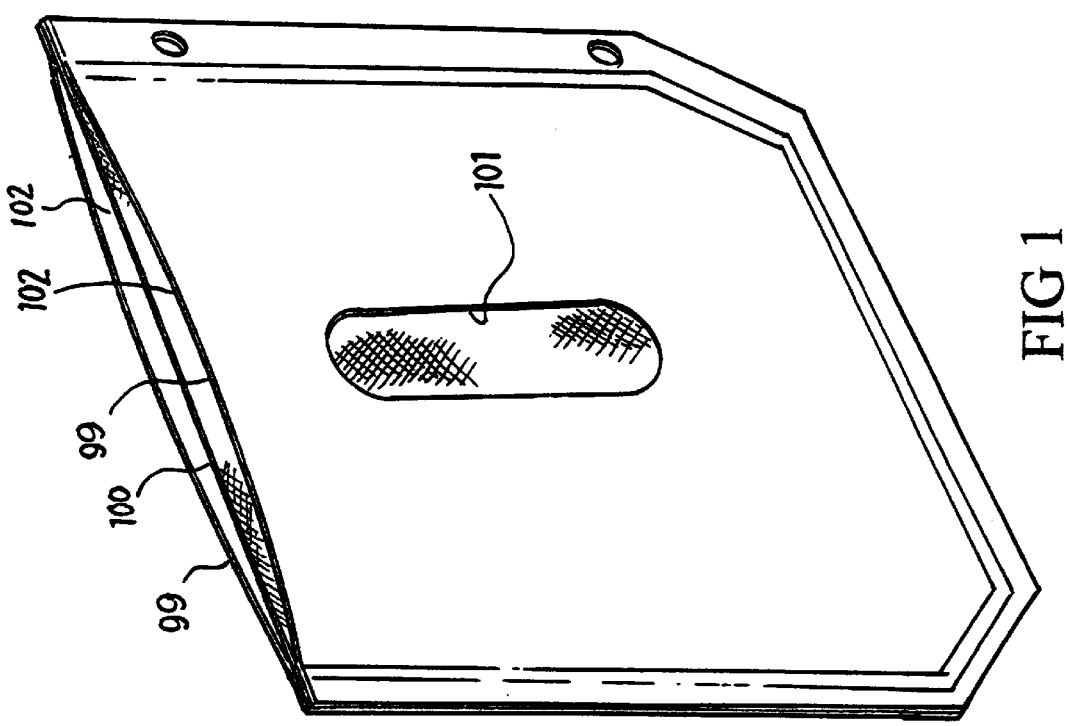
FIG. 1 is a perspective elevation of a disk jacket made according to the present invention.

As shown in FIG. 1, a disk jacket made according to the present invention includes an outer layer of a polypropylene (PP) surface material 90, an inner layer of a non-woven cloth lining material 100, and a space that is defined between the outer and inner layers, and that forms a pocket portion adapted to receive a disk 3. And in order to facilitate insertion or removal of the disk, the PP surface material 90 is provided with an opening 101 at a suitable position.

Figure 2:
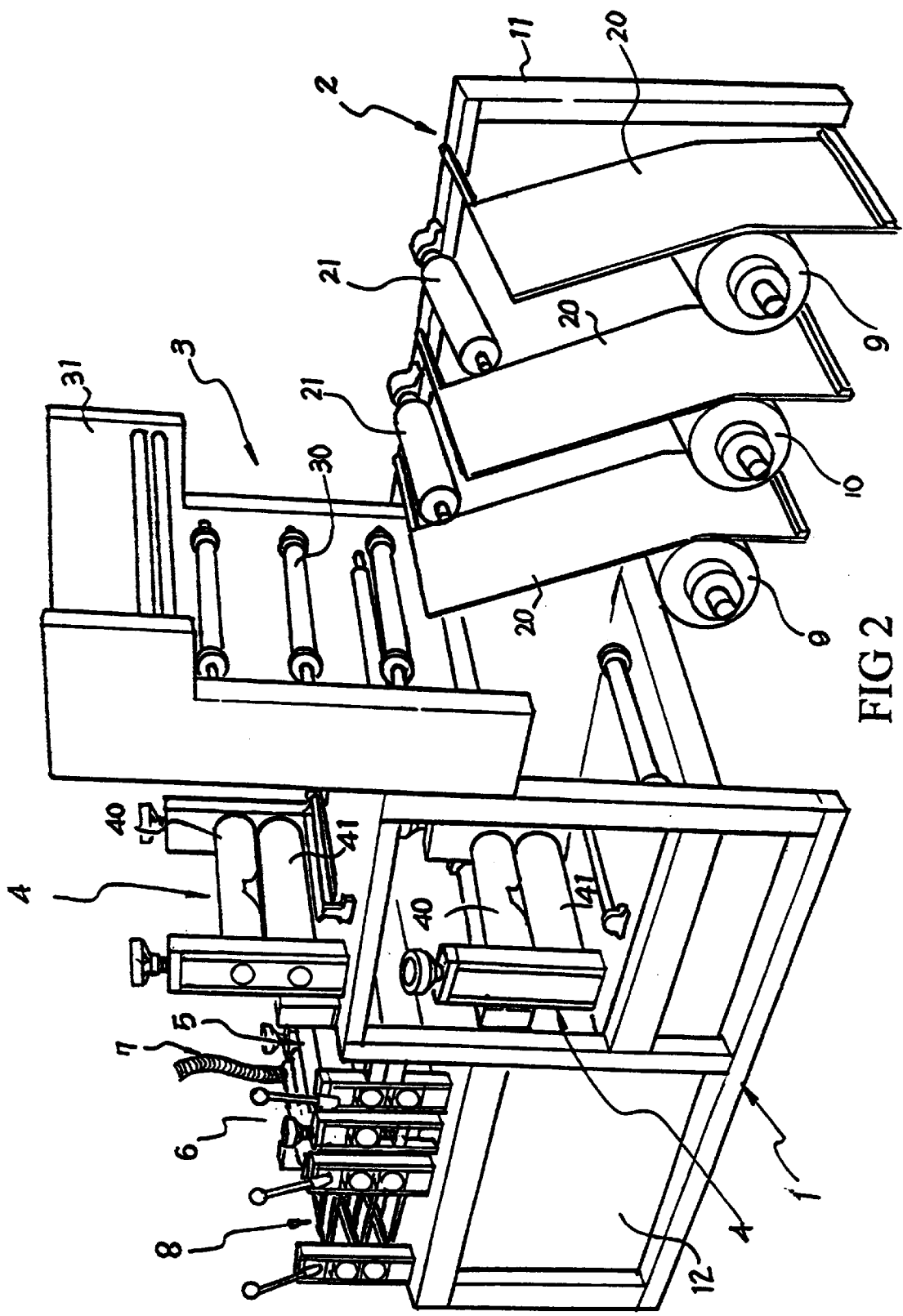
FIG. 2 is an elevation of a machine for making disk jackets according to the present invention.
Figure 3:
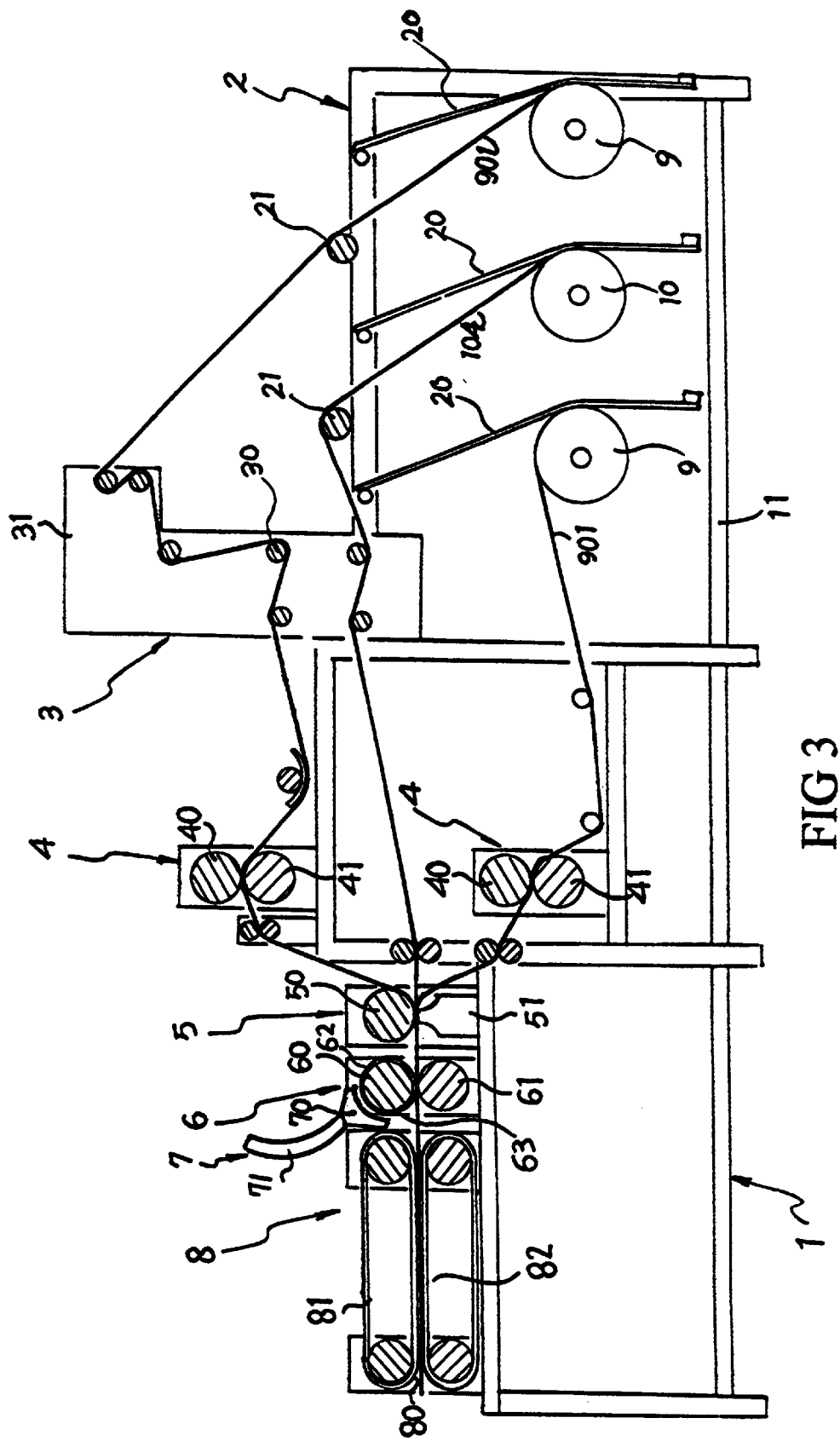
FIG. 3 is a side elevation of the present invention.

As shown in FIGS. 2 and 3, a machine for making a disk jacket according to the present invention comprises a machine table 1, on which are disposed in sequence a raw material mount 2, a feed roller unit 3, a first cutter unit 4, a closure unit 5, a second cutting unit 6, a scrap drawing unit 7, and a conveyor unit 8. Polypropylene material rolls 9 and non-woven cloth material rolls 10 are placed on the raw material mount 2, and polypropylene films 901 and non-woven cloth 104 are drawn from the material rolls and overlapped via the feed roller unit 3 to be cut by the first cutter unit 4, pressure sealed using ultrasonic waves by the ultrasonic closure unit 5, cut into shape by the second cutter unit 6, and then output as disk jackets by the conveyor unit 8, in which the scraps formed during cutting are sucked out by the scrap drawing unit 7 for disposal as a whole. The machine table 1 is a generally oblong structure including a plurality of posts 11 and cover plates 12. The raw material mount 2 is disposed at a foremost portion of the machine table 1 and is provided with a plurality of gravity pressure plates 20 and a plurality of guide rollers 21 so as to exert a certain pressure on the PP material roll 9 and the non-woven cloth material roll 10 so that, when the non-woven cloth 104 and the PP film 901 are drawn out, they can maintain a certain tension. The guide rollers 21 ensure that the non-woven cloth 901 and the PP film can be guided into the feed roller unit 3 following a determined direction.

The feed roller unit 3 is provided with parallel rollers 30 arranged in rows, so that the non-woven cloth 104 and the PP film 901 can be stretched suitably when being drawn out. After stretching via the rollers 30, the PP film 901 enters the first cutter unit 4, whereas the non-woven cloth 104 goes around the feed roller unit 3 to be overlapped with the cut PP film 90 1.

The first cutter unit 4 is provided with an upper roller and a lower roller, one on top of the other. The upper roller, provided with a cutter, is a first cutter roller 40, whereas the lower roller, having a smooth surface, forms a first packing roller 41. After passing through the first cutter unit 4, the PP film 901 is formed with an initial cut opening 101. The opening 101 may be an U-shaped one provided at the mouth of the disk jacket or an elongate opening on its surface. The closure unit 5 is provide with an ultrasonic horn 51 to stack the initially cut PP film 901 and the non-woven cloth 104 one on top of the other, which are then fed into an ultrasonic roller unit 50. The ultrasonic roller unit 50 has a surface provided with press strips, a specific shape can be pressed out. And every rotation of the ultrasonic roller unit 50, the PP film 901 and the non-woven cloth 104 can be formed into a disk jacket using ultrasonic waves.

The second cutter unit 6 is provided to cut the edges of the disk jacket formed by the PP film 901 and the non-woven cloth 104 using ultrasonic waves, and includes a second cutter roller 60 and a second packing roller 61 disposed one on top of the other so that, at every turning thereof, one disk jacket can be cut off from the PP film 901 and the non-woven cloth 104. The surface of the second cutter roller 60 is provided with a cutter 63 that matches the shape of the disk jacket. The remaining portion of the surface of the second cutter roller 60 has a soft roller face 62 of a soft material attached thereto. The cutter 63 and the soft roller face 62 cooperate to ensure the smoothness and precision of the cutting operation.

The scrap drawing unit 7 is disposed above and behind the second cutter unit 6 to suck out scraps (for instance, scraps formed during holes cutting will adhere to the cutter 63) formed during the cutting operation for disposal in a batch. The scrap drawing unit 7 includes a suction hood 70 and a suction hose 71, the latter being connected to an air suction device. The scrap drawing unit 7 is adapted to suck up tiny bits of scraps like a vacuum cleaner does.

The conveyor unit 8 is disposed below and close behind the second cutter unit 6 to transport the disk jackets thus formed in the above-described operation. The conveyor unit 8 includes an upper conveyor face 81 and a lower conveyor face 82 disposed one on top of the other, with an output portion 80 defined therebetween. The disk jackets are delivered between the upper and lower conveyor faces 81, 82 in the output portion 80 to a determined position.

In summary, the present invention provides a machine for making standardized disk jacket on a mass-production scale. Besides, no toxic gases will be generated during production.

Although the present invention has been illustrated and described with reference to the preferred embodiment thereof, it should be understood that it is in no way limited to the details of such embodiment but is capable of numerous modifications within the scope of the appended claims.

What is claimed is:

1. An automated machine for making disk jackets, said disk jackets including an outer polypropylene surface material and an inner non-woven cloth lining material, that define one or more than one pocket portion therebetween adapted to receive a disk, said polypropylene surface material being provided with an opening at a suitable position to facilitate insertion or removal of said disk, said automated machine comprising a machine table, on which are disposed in sequence a raw material mount, a feed roller unit, a first cutter unit, a closure unit, a second cutting unit, a scrap drawing unit, and a conveyor unit, polypropylene material rolls and non-woven cloth material rolls being placed on said raw material mount, and polypropylene films and non-woven cloth being drawn from said material rolls to be overlapped via said feed roller unit and to be cut by said first cutter unit, pressure-sealed using ultrasonic waves by said ultrasonic closure unit, cut into shape by said second cutter unit, and then output as disk jackets by said conveyor unit, the scraps formed during the cutting operation being sucked out by said scrap drawing unit for disposal as a whole, wherein said machine table is a generally oblong structure including a plurality of posts and cover plates, said raw material mount is disposed at a foremost portion of said machine table and is provided with a plurality of gravity pressure plates and a plurality of guide rollers so as to exert a certain pressure on said polypropylene material roll and said non-woven cloth material roll so that, when said non-woven cloth and said polypropylene film are drawn out, they can maintain a certain tension, said guide rollers ensuring that said non-woven cloth and said polypropylene film can be guided into said feed roller unit following a determined direction;

said feed roller unit is provided with parallel rollers arranged in rows, so that said non-woven cloth and said polypropylene film can be stretched suitably when being drawn out, said polypropylene film entering said first cutter unit after being stretched via said rollers, whereas said non-woven cloth goes around said feed roller unit to be overlapped with said cut polypropylene film, said first cutter unit is provided with upper and lower rollers, one on top of the other, said upper roller being provided with a cutter and forming a first cutter roller, said lower roller having a smooth surface and forming a first packing roller, said polypropylene film being formed with an initial cut opening after passing through said first cutter unit, said opening being an U-shaped one provided at a mouth of said disk jacket or an elongate opening on a surface of said disk jacket;

said closure unit is provide with an ultrasonic horn to stack said initially cut polypropylene film and said non-woven cloth one on top of the other, which are then fed into an ultrasonic roller unit, said ultrasonic roller unit having a surface provided with press strips adapted to press out a specific shape, said polypropylene film and said non-woven cloth being formed into a disk jacket using ultrasonic waves at every rotation of said ultrasonic roller unit, said second cutter unit is provided to cut the edges of said disk jacket formed by said polypropylene film and said non-woven cloth using ultrasonic waves, and includes a second cutter roller and a second packing roller disposed one on top of the other so that, at every turning thereof, one disk jacket can be cut off from said polypropylene film and said non-woven cloth, said second cutter roller having a surface provided with a cutter that matches the shape of said disk jacket, the remaining portion of said surface of said second cutter roller having a soft roller face of a soft material attached thereto, said cutter and said soft roller face cooperating to ensure the smoothness and precision of the cutting operation;

said scrap drawing unit is disposed above and behind said second cutter unit to suck out scraps formed during the cutting operation for disposal in a batch, and includes a suction hood and a suction hose, said suction hose being connected to an air suction device, said scrap drawing unit being adapted to suck up tiny bits of scraps like a vacuum cleaner does; and said conveyor unit is disposed below and close behind said second cutter unit to transport said disk jackets thus formed, said conveyor unit including an upper conveyor face and a lower conveyor face disposed one on top of the other, with an output portion defined therebetween, said disk jackets being delivered between said upper and lower conveyor faces along said output portion to a determined position.

* * * * *